United States Patent [19]
Pieper

[11] Patent Number: 5,395,416
[45] Date of Patent: Mar. 7, 1995

[54] REGENERATIVE GLASS MELTING FURNACE WITH REDUCED $NO_x$ EMISSION

[75] Inventor: Helmut Pieper, Lohr/Main, Germany

[73] Assignee: Beteiligungen Sorg GmbH & Co. KG, Lohr/Main, Germany

[21] Appl. No.: 11,911

[22] Filed: Feb. 1, 1993

[30] Foreign Application Priority Data

Jul. 11, 1992 [DE] Germany ............... 42 22 863.8

[51] Int. Cl.⁶ ............................................. C03B 5/435
[52] U.S. Cl. .................................... 65/134.1; 65/157; 65/347; 431/170; 431/167; 431/175; 431/181; 432/195
[58] Field of Search ............... 432/195; 65/347, 335, 65/157, 135; 431/167, 170, 174, 175, 181

[56] References Cited

U.S. PATENT DOCUMENTS

| | | | |
|---|---|---|---|
| 1,831,619 | 11/1931 | Allen | 65/347 |
| 2,228,347 | 6/1938 | Drake | 65/347 |
| 3,511,630 | 5/1970 | Hickey | 65/347 |
| 4,347,072 | 8/1982 | Nagaoka | 65/347 |
| 4,553,997 | 11/1985 | Anat | 65/347 |

*Primary Examiner*—W. Gary Jones
*Assistant Examiner*—John Hoffmann
*Attorney, Agent, or Firm*—Hill, Steadman & Simpson

[57] ABSTRACT

Regenerative glass melting furnace of the type having a batch section where glass is melted, a port neck where combustion air is introduced, and burners supplied by fuel inlet nozzles in the floor, the roof, and the lateral walls of the port neck.

12 Claims, 2 Drawing Sheets

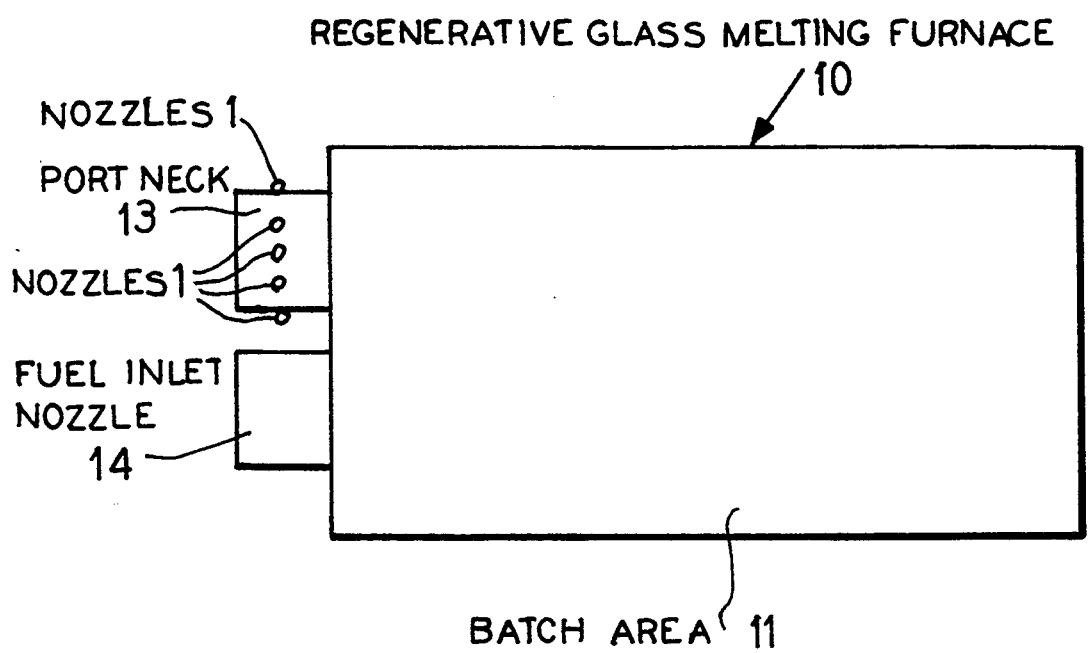

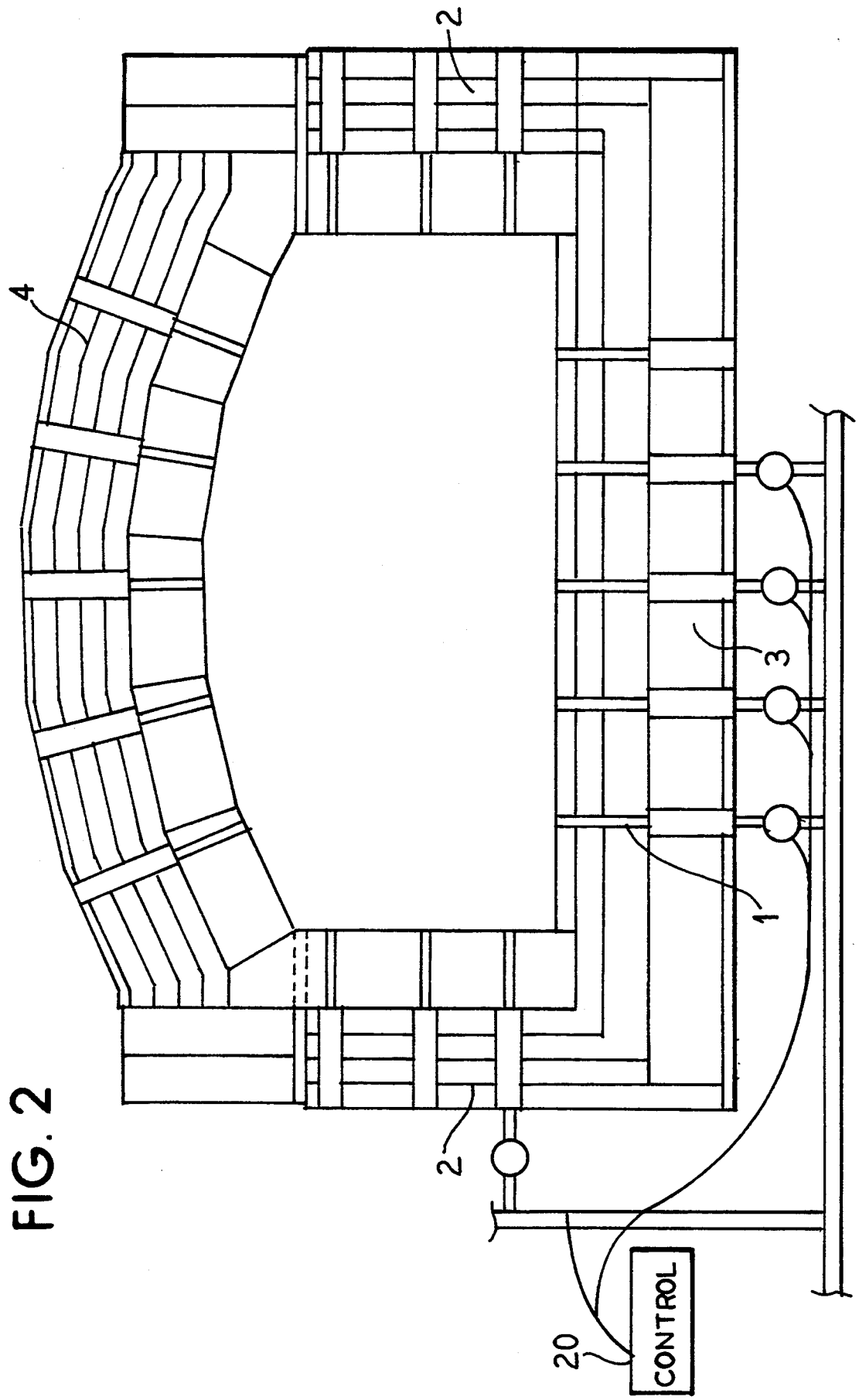

REGENERATIVE GLASS MELTING FURNACE WITH REDUCED NO$_x$ EMISSION

BACKGROUND OF THE INVENTION

The invention relates to a regenerative melting furnace with burners installed in the port neck, into which fuel is fed through fuel inlet nozzles, and to a method of operating such a glass melting furnace.

In regenerative furnaces, which have long been known, the mixture of fuel and the very highly preheated air is achieved by relatively high differential velocities of the two media, which give high impulse mixing.

A disadvantage of these furnaces, however, is the very high flame core temperatures which result from the homogenous mixing of fuel and hot, preheated air. This results in high nitrogen oxide content of the flue gases of these regenerative furnaces. Regenerative furnaces, therefore, increasingly fail to rate approval.

SUMMARY OF THE INVENTION

It is therefore the object of the invention to create regenerative tanks with a low NO$_x$ output, in which the peak temperatures in the flame during combustion are reduced and a uniform flame distribution is produced, which radiates onto the glass bath as effectively as the high-impulse flame.

It is necessary to assure that the energy concentration can be shifted along the flame axis i.e., that in the case of more heavily charged furnaces more energy is available in the melting area and less in the refining area.

This object is achieved in this type of furnace by arranging the fuel inlet nozzles in the side walls, in the floor, and in the roof of the port neck.

BRIEF DESCRIPTION OF THE DRAWINGS

FIG. 1 is a block diagram view of a glass melting furnace according to the invention; and FIG. 2 is a cross section of a port neck.

DETAILED DESCRIPTION OF THE PREFERRED EMBODIMENT

A regenerative glass melting furnace is shown schematically in side view at 10 in FIG. 1 which includes a batch area 11. A port neck 13 is provided through which combustion air is supplied to the batch area 11 and which also includes fuel nozzles 1 as described in detail below.

A fuel inlet nozzle 14 is situated below the port neck 13 directed into the batch area 11 to provide underport firing.

In FIG. 2, the port neck 13 is shown as including sidewalls, floor 3, roof 4, and fuel nozzles 1 on all sides.

The division of the fuel flow into many small individual streams which impinge upon the periphery of the air stream results in a broad band of flames in which the maximum temperatures in the flame core cannot reach the same level as they can in the conventional regenerative furnaces with high impulse mixing.

The flame length can be regulated by shutting off some of the fuel feed nozzles completely by means of a control 26, so that the supply of fuel to remaining nozzles is increased, thereby making the mixing effect greater and the flame length shorter. However, this is necessarily accompanied by a slight increase of the nitrogen oxide content of the waste gases.

A second possibility is to vary the relative amounts of fuel supplied to the nozzles. If, for example, the nozzles situated in the floor of the port neck are supplied with more fuel, a band of flame will form in the batch area, which primarily supplies energy to the batch area.

If the nozzles installed above are supplied with more fuel, the flame becomes longer.

Furthermore, by supplying the right or Left nozzles in the direction of flow, the band of flame will be steered more to the outside or more toward the middle of the furnace.

As can be seen, the new burner arrangement can be used in combination with an existing underport firing system, so that existing glass melting furnaces can easily be retrofitted, and heating can be optimized for every furnace load.

Consequently this can be considered to be a perfect solution to the problems in question.

I claim:

1. Regenerative glass melting furnace comprising:
   a batch section where glass is melted,
   a port neck through which combustion air is supplied to said batch section, said port neck having opposed lateral walls, a floor, and a roof,
   fuel inlet nozzles situated in the lateral walls of the port neck, and
   fuel inlet nozzles situated in the floor of the port neck.

2. Regenerative glass melting furnace as in claim 1 wherein the number of fuel inlet nozzles in each lateral wall is two to four.

3. Regenerative glass melting furnace as in claim 2 further comprising means for individually and independently adjusting fuel supplied to each nozzle.

4. Regenerative glass melting furnace as in claim 1 wherein the number of fuel nozzles in the floor of the port neck is three to seven.

5. Regenerative glass melting furnace as in claim 1 further comprising means for individually and independently adjusting fuel supplied to each nozzle.

6. Regenerative glass melting furnace as in claim 1 further comprising means for independently adjusting fuel supply to groups of the fuel nozzles.

7. Regenerative glass melting furnace as in claim 1 further comprising fuel inlet nozzles situated below said port neck and directed into said batch section.

8. Regenerative glass melting furnace comprising:
   a batch section where glass is melted,
   a port neck through which combustion air is supplied to said batch section, said port neck having opposed lateral walls, a floor, and a roof,
   fuel inlet nozzles situated in the lateral walls of the port neck, and
   fuel inlet nozzles situated in the roof of the port neck.

9. Regenerative glass melting furnace as in claim 8 wherein the number of fuel nozzles in the roof of the port neck is three to seven.

10. Regenerative glass melting furnace as in claim 8 further comprising means for individually and independently adjusting fuel supplied to each nozzle.

11. Regenerative glass melting furnace as in claim 8 further comprising means for independently adjusting fuel supply to groups of fuel nozzles.

12. Regenerative glass melting furnace as in claim 8 comprising fuel inlet nozzles situated below said port neck and directed into said batch section.

* * * * *